United States Patent
MacLennan

(10) Patent No.: US 8,628,843 B2
(45) Date of Patent: Jan. 14, 2014

(54) COMPOSITE PTFE MATERIALS AND APPLICATIONS THEREOF

(75) Inventor: Andrew James MacLennan, Inverness (GB)

(73) Assignee: Porex Corporation, Fairburn, GA (US)

( * ) Notice: Subject to any disclaimer, the term of this patent is extended or adjusted under 35 U.S.C. 154(b) by 730 days.

(21) Appl. No.: 12/604,702

(22) Filed: Oct. 23, 2009

(65) Prior Publication Data

US 2010/0104845 A1    Apr. 29, 2010

Related U.S. Application Data

(60) Provisional application No. 61/108,372, filed on Oct. 24, 2008.

(51) Int. Cl.

| B32B 5/00 | (2006.01) |
|---|---|
| B32B 5/16 | (2006.01) |
| B32B 5/18 | (2006.01) |
| B32B 7/02 | (2006.01) |
| B32B 27/18 | (2006.01) |
| B32B 27/20 | (2006.01) |
| B32B 27/28 | (2006.01) |
| B29C 67/02 | (2006.01) |
| B29C 67/04 | (2006.01) |
| B29C 67/20 | (2006.01) |
| B29C 67/24 | (2006.01) |

(52) U.S. Cl.
USPC .......... 428/317.9; 428/304.4; 428/318.4; 428/319.3; 428/402; 428/421; 428/422; 264/109; 264/118; 264/124; 264/125; 264/126; 264/127

(58) Field of Classification Search
None
See application file for complete search history.

(56) References Cited

U.S. PATENT DOCUMENTS

| 3,238,148 | A |   | 3/1966  | Osborne |         |
|---|---|---|---|---|---|
| 3,297,805 | A |   | 1/1967  | Rottig et al. |  |
| 3,855,191 | A | * | 12/1974 | Doughty et al. | 526/214 |
| 3,911,072 | A | * | 10/1975 | Saito et al.   | 264/117 |
| 3,997,494 | A | * | 12/1976 | Lever et al.   | 524/586 |
| 4,129,470 | A | * | 12/1978 | Homsy          | 156/155 |
| 4,143,110 | A | * | 3/1979  | Morozumi et al.| 264/117 |
| 4,159,370 | A | * | 6/1979  | Koizumi et al. | 526/73  |
| 4,370,436 | A | * | 1/1983  | Nakamura et al.| 524/322 |
| 4,391,940 | A | * | 7/1983  | Kuhls et al.   | 524/458 |
| 4,491,553 | A | * | 1/1985  | Yamada et al.  | 264/51  |
| 4,610,808 | A | * | 9/1986  | Kleiner        | 252/512 |

(Continued)

FOREIGN PATENT DOCUMENTS

| EP | 0736266 | 10/1996 |
|---|---|---|
| EP | 1464381 | 10/2004 |

(Continued)

OTHER PUBLICATIONS

"EP04800587.0 Sixth Office Action dated Jun. 9, 2010".

(Continued)

*Primary Examiner* — Vivian Chen
(74) *Attorney, Agent, or Firm* — Kilpatrick Townsend & Stockton LLP

(57) ABSTRACT

The present invention provides sintered composite polymeric materials and methods of making and using the same. The sintered composite polymeric materials are made by sintering composite particles comprising a polytetrafluoroethylene component and a carbonaceous component, wherein the carbonaceous component is dispersed throughout the polytetrafluoroethylene component.

19 Claims, 5 Drawing Sheets

(56) References Cited

U.S. PATENT DOCUMENTS

| | | | | |
|---|---|---|---|---|
| 4,775,501 A | * | 10/1988 | Rosenzweig et al. | 264/450 |
| 4,921,648 A | * | 5/1990 | Soni et al. | 264/450 |
| 5,106,538 A | * | 4/1992 | Barma et al. | 252/511 |
| 5,106,540 A | * | 4/1992 | Barma et al. | 252/511 |
| 5,230,952 A | * | 7/1993 | McCord | 428/300.4 |
| 5,321,059 A | * | 6/1994 | Honda et al. | 523/212 |
| 5,512,342 A | | 4/1996 | Rober et al. | |
| 5,514,231 A | * | 5/1996 | Thomas | 156/62.2 |
| 5,527,569 A | * | 6/1996 | Hobson et al. | 428/35.2 |
| 5,587,110 A | * | 12/1996 | Yamana et al. | 252/511 |
| 5,677,047 A | * | 10/1997 | Thomas | 428/315.5 |
| 5,709,944 A | * | 1/1998 | Kokumai et al. | 428/402 |
| 5,886,090 A | * | 3/1999 | Yamana et al. | 524/546 |
| 5,916,958 A | * | 6/1999 | Kelly et al. | 524/497 |
| 6,143,675 A | * | 11/2000 | McCollam et al. | 442/221 |
| 6,218,000 B1 | * | 4/2001 | Rudolf et al. | 428/317.9 |
| 6,223,933 B1 | | 5/2001 | Hochrainer et al. | |
| 6,533,955 B1 | * | 3/2003 | Molnar et al. | 252/511 |
| 6,551,608 B2 | * | 4/2003 | Yao | 424/409 |
| 6,638,610 B1 | * | 10/2003 | Yao | 428/304.4 |
| 6,998,434 B2 | * | 2/2006 | Wadahara et al. | 524/495 |
| 7,125,490 B2 | * | 10/2006 | Clendenning et al. | 210/493.4 |
| 7,744,792 B2 | * | 6/2010 | Roberts | 264/127 |
| 7,884,145 B2 | * | 2/2011 | Hoshikawa et al. | 523/200 |
| 8,137,812 B2 | * | 3/2012 | Kitahara et al. | 428/421 |
| 8,141,717 B2 | * | 3/2012 | Wingo et al. | 210/510.1 |
| 8,187,534 B2 | * | 5/2012 | Mao | 422/50 |
| 2003/0029789 A1 | | 2/2003 | Patil | |
| 2004/0195173 A1 | * | 10/2004 | Huang et al. | 210/490 |
| 2008/0017569 A1 | * | 1/2008 | Ramsey et al. | 210/490 |
| 2008/0149571 A1 | * | 6/2008 | Zeller et al. | 210/767 |
| 2008/0220271 A1 | | 9/2008 | Baumert et al. | |
| 2008/0227880 A1 | * | 9/2008 | Yoshimoto et al. | 521/134 |

FOREIGN PATENT DOCUMENTS

| | | | |
|---|---|---|---|
| GB | 1209530 | | 10/1970 |
| GB | 1435067 | | 5/1976 |
| GB | 1549949 | | 8/1979 |
| GB | 2337991 | | 12/1999 |
| JP | 63308158 | | 12/1988 |
| JP | 09-057029 | * | 3/1997 |
| JP | 09165301 | | 6/1997 |
| JP | 2000273675 | | 10/2000 |
| JP | 2001354797 | | 12/2001 |
| JP | 2002336619 | | 11/2002 |
| WO | WO-0137995 | | 5/2001 |
| WO | WO-0165937 | | 9/2001 |
| WO | WO-2006127946 | | 11/2006 |
| WO | WO-2007133609 | | 11/2007 |
| WO | WO-2010048496 | | 4/2010 |

OTHER PUBLICATIONS

"EP04800587.0 Fifth Office Action dated Oct. 21, 2009".
"EP04800587.0 First Office Action dated Jan. 25, 2007".
"EP04800587.0 Office Action dated Dec. 10, 2008".
"EP04800587.0 Second Office Action dated Aug. 2, 2007".
"EP04800587.0 Third Office Action dated Mar. 13, 2008".
"PCT/US2004/036447 International Preliminary Examination Report dated Sep. 21, 2005".
"PCT/US2004/036447 International Search Report dated Feb. 24, 2005".
"U.S. Appl. No. 10/978,449 Final Office Action dated May 23, 2007".
"U.S. Appl. No. 10/978,449 Final Office Action dated Nov. 5, 2008".
"U.S. Appl. No. 10/978,449 Non-Final Office Action dated Jan. 2, 2008".
"U.S. Appl. No. 10/978,449 Non-Final Office Action dated Jan. 8, 2010".
"U.S. Appl. No. 10/978,449 Non-Final Office Action dated Jul. 7, 2009".
"U.S. Appl. No. 10/978,449 Non-Final Office Action dated Sep. 27, 2006".
"U.S. Appl. No. 10/978,449 Final Office Action dated May 18, 2010".
PCT/US2009/061825 International Search Report and Written Opinion dated Jan. 21, 2010.
European Patent Application No. 04800587.0, "Office Action" dated Sep. 15, 2011, 3.
U.S. Appl. No. 10/978,449, "Advisory Action", mailed Mar. 9, 2009.
U.S. Appl. No. 10/978,449, "Notice of Allowance", mailed Jul. 6, 2010.
U.S. Appl. No. 10/978,449, "Request for Continued Examination", filed May 5, 2009.
U.S. Appl. No. 10/978,449, "Request for Continued Examination", filed Oct. 23, 2007.
U.S. Appl. No. 10/978,449, "Response to Final Office Action", filed Jun. 28, 2010.
U.S. Appl. No. 10/978,449, "Response to Final Office Action", filed Mar. 5, 2009.
U.S. Appl. No. 10/978,449, "Response to Office Action", filed Apr. 7, 2010.
U.S. Appl. No. 10/978,449, "Response to Office Action", filed Feb. 27, 2007.
U.S. Appl. No. 10/978,449, "Response to Office Action", filed Jul. 2, 2008.
U.S. Appl. No. 10/978,449, "Response to Office Action", filed Oct. 6, 2009.
U.S. Appl. No. 10/978,449, "Supplemental Response to Office Action", filed Dec. 3, 2009.
European Patent Application No. 04800587.0, "Office Action", mailed Nov. 18, 2010.
European Patent Application No. 04800587.0, "Response to Office Action", filed Apr. 20, 2009.
European Patent Application No. 04800587.0, "Response to Office Action", filed Feb. 24, 2010.
European Patent Application No. 04800587.0, "Response to Office Action", filed Jul. 22, 2008.
European Patent Application No. 04800587.0, "Response to Office Action", filed Mar. 28, 2011.
European Patent Application No. 04800587.0, "Response to Office Action", filed May 29, 2007.
European Patent Application No. 04800587.0, "Response to Office Action", filed Nov. 16, 2007.
European Patent Application No. 04800587.0, "Response to Office Action", filed Sep. 29, 2010.

* cited by examiner 102　　　　　　　　　　　　　　102
　　　　　　100　　　100

US 8,628,843 B2

COMPOSITE PTFE MATERIALS AND APPLICATIONS THEREOF

PRIOR RELATED APPLICATIONS

The present application claims the benefit of priority to U.S. Provisional Application No. 61/108,372 filed Oct. 24, 2008 which is hereby incorporated by reference in its entirety.

FIELD OF THE INVENTION

The present invention relates to composite porous polymeric materials comprising sintered composite particles comprising a polytetrafluoroethylene (PTFE) component and a carbonaceous component dispersed in the PTFE component.

BACKGROUND OF THE INVENTION

The unique properties of PTFE, such as its outstanding electrical resistance, low coefficient of friction, chemical inertness, and non-support of combustion, have resulted in the use of PTFE in a wide range of applications. However, properties such as high melt viscosity and high crystallinity preclude PTFE from being processed by traditional techniques for plastics. Compounding PTFE with various materials, for example, can be difficult often resulting in substantial inhomogeneity in the final product. Moreover, the resistance of PTFE to adhere to other materials presents significant challenges in producing composite PTFE materials that do not dissociate when subjected to various environmental stresses. Currently available composite materials comprising PTFE and a carbonaceous filler, for example, can shed or leach the carbonaceous filler when subjected to various stresses.

Furthermore, the non-porous nature of PTFE produced by established methods presents additional difficulties in using this material in applications wherein porous materials are required, including diffusion, filtration, and porous barrier applications. Composite porous PTFE materials present even greater problems due to the tendency of some of these materials to dissociate into component parts when subjected to various stresses, including mechanical stresses used to induce porosity in PTFE. Additionally, the dissociative nature of some composite porous PTFE materials can render such materials unsuitable for applications where contamination resulting from the dissociation is undesirable. Composite PTFE materials having fillers, for example, may be unsuitable for filtration applications as dissociated filler can contaminate the filtered product or filtrate.

SUMMARY

In view of the foregoing disadvantages, the present invention provides composite PTFE materials that demonstrate superior homogeneity and resistance to dissociation into composite components. In some embodiments, the composite PTFE materials of the present invention are porous thereby permitting their use in applications where porous materials are required, including diffusion, filtration, and porous barrier applications. Moreover, the present invention provides methods of making composite PTFE materials and methods of using these materials.

Composite Particles

In one embodiment, the present invention utilizes sintered composite particles comprising a PTFE component and a carbonaceous component, wherein the carbonaceous component is dispersed throughout the PTFE component (FIG. 2). In some embodiments, the carbonaceous component comprises carbon black, graphite, amorphous carbon, carbon fiber, active carbon, carbon nanotubes, or mixtures thereof. Moreover, in some embodiments, a composite particle comprising a PTFE component and a carbonaceous component dispersed throughout the PTFE component has a size ranging from about 0.1 µm to about 1 mm. The PTFE component is particulate and non-fibrillated.

A composite particle comprising a PTFE component and a carbonaceous component dispersed throughout the PTFE component, in some embodiments, has a black color.

Composite Material

In another embodiment, the present invention provides a composite material comprising a plurality of sintered composite particles, the composite particles comprising a PTFE component and a carbonaceous component dispersed throughout the PTFE component as described herein. These composite materials are also called sintered composite materials herein. In some embodiments, the composite material is porous. A porous composite material, in one embodiment, for example, has an average pore size ranging from about 0.1 µm to about 500 µm, from about 0.25 µm to about 250 µm, 0.4 µm to about 100 µm or from about 0.5 µm to about 50 µm. In some embodiments, a porous composite material has a porosity ranging from about 10 percent to about 90 percent, from about 15 to about 80 percent, from about 20 to about 60 percent, or from about 30 to 5 about 0 percent.

In comprising a plurality of sintered composite particles of the present invention, a composite material, in some embodiments, can have a black color. In one embodiment, a sintered composite material has a spectral reflectance of less than about 20 percent or less than about 15 percent. In another embodiment, a sintered composite material has a spectral reflectance of less than about 10 percent. In some embodiments, a sintered composite material has a spectral reflectance of less than about 5 percent or less than about 3 percent. A sintered composite material, in some embodiments, has a spectral reflectance of less than about 1 percent. Additionally, in comprising a plurality of sintered composite particles of the present invention, a composite material, in some embodiments, does not comprise fibrillated PTFE.

Membranes

In another embodiment, the present invention provides a membrane comprising a porous composite material, the porous composite material comprising a plurality of sintered composite particles, the composite particles comprising a PTFE component and a carbonaceous component dispersed throughout the PTFE component. A membrane, according to some embodiments of the present invention, can have a thickness ranging from about 50 µm to about 5 mm, from about 100 µm to about 5 mm, from about 200 µm to about 2.5 mm, or from about 300 µm to about 1 mm. In some embodiments, the thickness is less than 100 µm or greater than about 5 mm.

A membrane, according to some embodiments of the present invention, can demonstrate properties consistent with those provided for sintered composite materials described herein. In some embodiments, a sintered porous composite material has a porosity ranging from about 10 percent to about 90 percent, from about 15 to about 80 percent, from about 20 to about 60 percent, or from about 30 to about 50 percent.

In some embodiments, a membrane comprising a sintered porous composite material has a spectral reflectance of less than about 20 percent, less than about 15 percent, less than about 10 percent, less than about 5 percent, less than about 3 percent, or less than about 1 percent. Moreover, in some embodiments, membranes of the present invention are free or substantially free of fibrillated PTFE.

Membranes of the present invention, in some embodiments, are used in fluid filtration applications. In other embodiments, membranes of the present invention are used in porous barrier applications, including protective covers for electronic equipment such as speakers, microphones, and other electronic devices. In some embodiments, membranes of the present invention are used as vents and/or packaging for electronic devices, including microelectronic devices. In a further embodiment, membranes of the present invention are used as electromagnetic shields. In other embodiments, membranes of the present invention are used in applications for absorbing visible light and ultraviolet radiation.

In another aspect, the present invention provides a membrane comprising a first surface and a second surface, wherein the first surface has a lighter color than the second surface. In some embodiments, for example, the first surface has a spectral reflectance of greater than about 80 percent, greater than about 90 percent or greater than about 95 percent while the second surface has a spectral reflectance of less than about 30 percent, less than about 20 percent, or less than about 10 percent. In some embodiments, the first and second surfaces are in facing opposition to one another on opposing sides of the membrane. In other embodiments, the first and second surfaces are adjacent to one another on the same side of the membrane.

The first surface of the membrane, in some embodiments, comprises a porous polymeric material comprising a plurality of sintered polymeric particles. In one embodiment, the polymeric particles comprise PTFE. In other embodiments, the polymeric particles comprise polyolefins, polyamides, polyesters, rigid polyurethanes, polyacrylonitriles, polycarbonates, polyvinylchloride, polymethylmethacrylate, polyvinylidene fluoride, polyethersulfones, polystyrenes, polyether imides, polyetheretherketones, polysulfones, or combinations or copolymers thereof. Polyolefins comprise polyethylene, polypropylene, and/or copolymers thereof. Polyethylene, in one embodiment, comprises high density polyethylene (HDPE). In another embodiment, polyethylene comprises ultrahigh molecular weight polyethylene (UHMWPE).

Moreover, in some embodiments, the second surface of the membrane comprises a porous polymeric material comprising a plurality of sintered composite polymeric particles, the composite polymeric particles comprising a PTFE component and a carbonaceous component dispersed throughout the PTFE component as described herein. In other embodiments, the second surface comprises black polymeric materials, black inks, black coatings, or particulate carbonaceous materials including carbon black, graphite, amorphous carbon, carbon fiber, active carbon, carbon nanotubes, or mixtures thereof.

The first and second surfaces, according to some embodiments of the present invention, can have properties consistent with any of those provided for sintered composite materials described herein. The first and second surfaces of a membrane, in some embodiments, have the same or substantially the same structure, including average pore size and porosity. In other embodiments, the first and second surfaces have different structures. In such embodiments, porosity and/or pore size gradients can be established between the first and second surfaces. In one embodiment, for example, the first surface can have an average pore size and/or porosity greater than the second surface. In another embodiment, the second surface can have an average pore size and/or porosity greater than the first surface.

Methods of Making Composite Particles and Composite Materials

In another aspect, the present invention provides methods of making composite particles and composite materials comprising the same. In one embodiment, a method of making composite particles comprises providing a PTFE component comprising a plurality of PTFE particles, providing a carbonaceous component, mixing the PTFE component and the carbonaceous component to form a mixture, heating the mixture to a temperature of about the microcrystalline melting point of the PTFE component to form a thermally treated material wherein the carbonaceous component is dispersed throughout the PTFE component, and breaking the thermally treated material into the composite particles. In some embodiments, the thermally treated material can be broken into composite particles of any desired size. In one embodiment, the thermally treated material is broken into composite particles having a size ranging from about 0.1 µm to about 500 µm or from about 1 µm to about 200 µm or from about 10 µm to about 100 µm.

In another embodiment, a method of making a composite material comprises providing a plurality of composite particles, the composite particles comprising a PTFE component and a carbonaceous component dispersed throughout the PTFE component, disposing the plurality of composite particles in a mold, applying a compressive force to the composite particles, relieving the compressive force on the composite particles, heating the composite particles to a temperature above the microcrystalline melting point of the PTFE component to form a porous composite material. The porous composite material is subsequently cooled and removed from the mold. In some embodiments, the composite material is a membrane. In other embodiments, the composite material is the first or second surface of a membrane as described herein.

In a further embodiment, the present invention provides methods of making a membrane which is a composite material comprising a first surface and a second surface wherein the first surface has a lighter color than the second surface. In one embodiment, a method of making such a membrane comprises providing a first membrane comprising a first surface, providing a second membrane comprising a second surface, and coupling the first membrane to the second membrane, wherein the first surface has a lighter color than the second surface. In some embodiments, the first surface comprises a porous polymeric material comprising a plurality of sintered polymeric particles. In some embodiments, the second surface comprises a porous polymeric material comprising a plurality of sintered composite polymeric particles, the composite polymeric particles comprising a PTFE component and a carbonaceous component dispersed throughout the PTFE component as described herein. Moreover, in some embodiments, coupling the first membrane to the second membrane comprises providing an adhesive and disposing the adhesive between the first membrane and the second membrane. In one embodiment, the adhesive is a preformed polymer web.

These and other embodiments are presented in greater detail in the detailed description which follows.

DETAILED DESCRIPTION OF PREFERRED EMBODIMENTS OF THE INVENTION

The present invention provides composite PTFE materials that demonstrate advantageous properties including superior homogeneity, resistance to dissociation, and desirable spectral characteristics. In some embodiments, composite PTFE materials are porous thereby permitting their use in applications where porous materials are required, including diffusion, filtration, and porous barrier applications. Additionally, the present invention provides methods of making composite PTFE materials and methods of using the same.

Composite PTFE Particles

Figure 2:
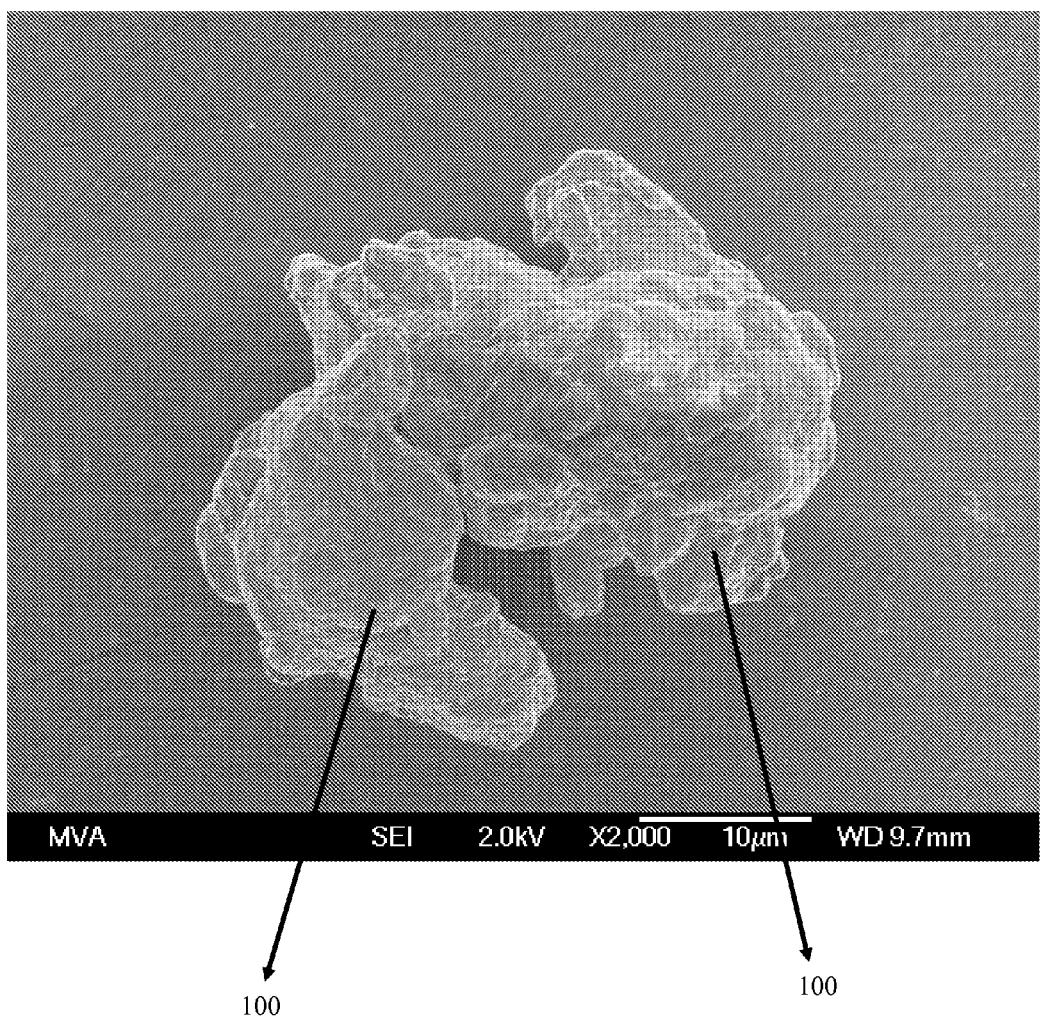
FIG. 2 illustrates an SEM image at a magnification of 2000× of a composite particle comprising a mixture of PTFE particles and carbon black powder subsequent to heating the mixture to about the microcrystalline melting point of the PTFE particles according to one embodiment of the present invention. The carbon is dispersed throughout the PTFE in the composite particle.

In one aspect, the present invention provide a composite particle comprising a PTFE component and a carbonaceous component, wherein the carbonaceous component is dispersed throughout the PTFE component (FIG. 2). In some embodiments, a composite particle comprising a PTFE component and a carbonaceous component has an average size ranging from about 0.1 μm to about 1 mm. In other embodiments, a composite particle has an average size ranging from about 1 μm to about 500 μm, from about 10 μm to about 250 μm, or from about 50 μm to about 100 μm. In a further embodiment, a composite particle has an average size ranging from about 100 μm to about 150 μm.

Turning now to components that can be included in a composite particle of the present invention, a composite particle of the present invention comprises a PTFE component. In some embodiments, the PTFE component comprises PTFE having a molecular weight of ranging from about 100,000 to about 2 million. In other embodiments, the PTFE has a molecular weight of less than about 100,000 or greater than about 2 million. Moreover, in some embodiments, the PTFE has a crystallinity ranging from 50 to 90 percent.

The PTFE component, according to some embodiments of the present invention, is provided in particle form. Dyneon GmbH is one vendor for the PTFE. In one embodiment, the PTFE component comprises a PTFE particle having an average particle size ranging from about 0.1 μm to about 1 mm. In another embodiment, a PTFE particle has an average particle size ranging from about 1 μm to about to about 500 μm, from about 10 μm to about 250 μm, or from about 50 μm to about 100 μm. In a further embodiment, a PTFE particle of the PTFE component has an average size ranging from about 100 μm to about 150 μm. PTFE particles, according to some embodiments, can demonstrate any of the molecular weights and crystallinities provided herein for PTFE Additionally, in having a particulate form in some embodiments, the PTFE component of the composite particle is not fibrillated.

In addition to a PTFE component, a composite particle of the present invention comprises a carbonaceous component dispersed throughout the PTFE component. When the PTFE component comprises a particle, for example, the carbonaceous component is dispersed throughout the PTFE particle. In some embodiments, a carbonaceous component comprises carbon particles comprising carbon black, graphite, amorphous carbon, active carbon, carbon fibers, carbon nanoparticles, or mixtures thereof. In some embodiments, carbon nanoparticles comprise carbon nanotubes, fullerenes, or mixtures thereof. In some embodiments, carbon nanotubes comprise single-walled carbon nanotubes (SWNT), multi-walled carbon nanotubes (MWNT), or mixtures thereof. Carbon nanotubes for use embodiments of the present invention can have any desired length including lengths greater than 1 μm.

Additionally, in some embodiments, carbon particles of the carbonaceous component have sizes ranging from about 100 nm to about 5 μm. In other embodiments, carbon particles of the carbonaceous component have sizes ranging from about 250 nm to about 3 μm, from about 500 nm to about 2 μm, or from about 750 nm to about 1 μm. In another embodiment, carbon particles of the carbonaceous component have sizes ranging from about 50 nm to about 500 nm. In a further embodiment, carbon particles of the carbonaceous component have sizes ranging less than about 50 nm or greater than about 5 μm.

In comprising a carbonaceous component dispersed throughout the PTFE component, a composite particle of the present invention, in some embodiments, has a black color.

Methods of Making Composite Particles

In another aspect, the present invention provides methods of making a composite particle comprising a PTFE component and a carbonaceous component dispersed throughout the PTFE component. In one embodiment, a method of making composite particles comprises providing a PTFE component comprising a plurality of PTFE particles, providing a carbonaceous component, mixing the PTFE component and the carbonaceous component to form a mixture, heating the mixture to a temperature of about the microcrystalline melting point of the PTFE component to form a thermally treated material wherein the carbonaceous component is dispersed throughout the PTFE component, and breaking the thermally treated material into the composite particles.

In some embodiments, the mixture of the PTFE component and the carbonaceous component comprises from about 1 weight percent to about 30 weight percent carbonaceous component. In other embodiments, the mixture of the PTFE component and the carbonaceous component comprises from about 5 weight percent to about 20 weight percent carbonaceous component. In another embodiment, the mixture of the PTFE component and the carbonaceous component comprises from about 10 weight percent to about 15 weight percent carbonaceous component or from about 1 weight percent to about 3 weight percent carbonaceous component. In another embodiment, the mixture of the PTFE component and the carbonaceous component comprises from about 0.1 weight percent to about 2 weight percent carbonaceous component. In a further embodiment, the mixture of the PTFE component and the carbonaceous component comprises less than about 1 weight percent, less than 0.5 weight percent, or less than 0.1 weight percent carbonaceous component. In a further embodiment, the mixture of the PTFE component and the carbonaceous component has greater than 30 weight percent carbonaceous component.

As provided herein, the mixture comprising the PTFE component and the carbonaceous component is heated to a temperature of about the microcrystalline melting point of the PTFE component. In some embodiments, the mixture is heated to a temperature between about 320° C. and 360° C. In one embodiment, the mixture is heated to a temperature of about 340° C.

The period of time over which the mixture is heated is directly proportional to the volume of the mixture. Generally, according to some embodiments, a mixture comprising the PTFE component and carbonaceous component is heated for a time period ranging from about 30 minutes to about 15 hours. In some embodiments, the mixture is heated for a time period ranging from about 1 hour to about 10 hours or from about 2 hours to about 5 hours or from about 3 hours to about 4 hours. In a further embodiment, a mixture comprising the PTFE component and the carbonaceous component is heated for a time period of less than about 30 minutes or greater than about 15 hours.

Heating the mixture to a temperature of about the microcrystalline melting point of the PTFE results in a relatively soft mass wherein the individual PTFE particles of the PTFE component are not completely fused together, but the carbon component is dispersed within the PTFE particles. The resultant relatively soft mass is subsequently broken up into composite particles by any one of various grinding techniques, and prior to further processing, may be sieved into fractions to obtain different granule sizes.

Figure 1:
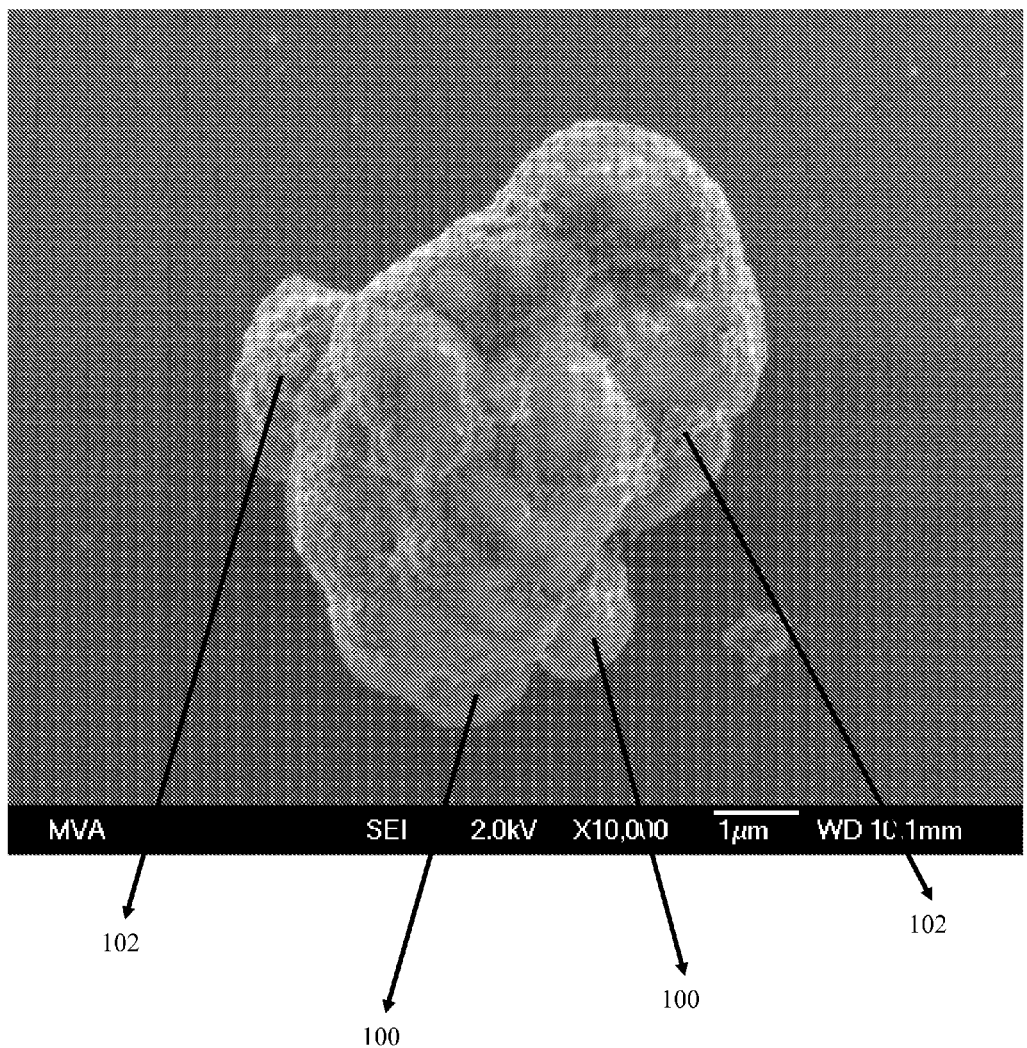
FIG. 1 illustrates a mixture of a PTFE particle and a carbonaceous component of carbon black powder partially embedded in the PTFE particle at a magnification of 10,000× obtained by scanning electron microscopy (SEM) according to one embodiment of the present invention.

Moreover, heating the mixture to a temperature of about the microcrystalline melting point of the PTFE particles results in the carbonaceous component being dispersed throughout the PTFE particles such that substantially none of the carbonaceous component is observable on surfaces of the PTFE particles. FIG. 1 illustrates an SEM image of a mixture of PTFE particles (100) and a carbonaceous component of carbon black powder (102) at a magnification of 10,000× according to one embodiment of the present invention. The SEM image of FIG. 1 was taken prior to heating the mixture to a temperature of about the microcrystalline melting point of the PTFE particles. As displayed in FIG. 1, the carbon black powder (102) resides on the surface of the PTFE particles (100) and is partially embedded in the PTFE particles prior to heating. FIG. 2 illustrates an SEM image of a composite particle at a magnification of 2000× subsequent to heating the mixture of the mixture of PTFE particles (100) and carbon black powder (102) to about the microcrystalline melting point of the PTFE particles. As illustrated in FIG. 2, the carbon black powder (102) has fused into and dispersed throughout the PTFE particles (100) and is no longer observable on surfaces of the PTFE particles. Movement of the carbon black powder (102) into and throughout a PTFE particle (100) results in the formation of a composite particle according to embodiments of the present invention. Incorporation of the carbonaceous component into the PTFE component, in some embodiments, advantageously precludes or inhibits dissociation, shedding, or leaching of the carbonaceous component from the PTFE component when the composite particles are subjected to various mechanical stresses such as those associated with further processing.

Sintered Porous Composite Materials

In another aspect, the present invention provides a composite material comprising a plurality of sintered composite particles, the composite particles comprising a PTFE component and a carbonaceous component as described herein. In some embodiments, the sintered composite material is porous. In one embodiment, a sintered porous composite material has an average pore size ranging from about 0.1 μm to about 500 μm. In some embodiments, a sintered porous composite material has an average pore size ranging from about 1 μm to about 300 μm or from about 10 μm to about 200 μm. In another embodiment, a porous composite material comprising a plurality of sintered composite particles has an average pore size ranging from about 0.1 μm to about 100 μm or from about 0.5 μm to about 50 μm.

In some embodiments a sintered porous composite material has a porosity ranging from about 10 percent to about 90 percent. In other embodiments, a sintered porous composite material has a porosity ranging from about 20 percent to about 80 percent or from about 30 percent to about 70 percent. In a further embodiment, a sintered porous composite material has a porosity greater than about 40 percent.

In some embodiments, a sintered porous composite material comprises a carbonaceous component in an amount ranging from about 1 weight percent to about 30 weight percent. In other embodiments, a sintered porous composite material comprises a carbonaceous component in an amount ranging from about 5 weight percent to about 20 weight percent or from about 10 weight percent to about 15 weight percent. In another embodiment, a sintered porous composite material comprises a carbonaceous component in an amount ranging from about 1 weight percent to about 3 weight percent. In some embodiments, a sintered porous composite material comprises a carbonaceous component in an amount less than about 1 weight percent, less than about 0.5 weight percent, or less than about 0.1 weight percent.

In comprising a plurality of sintered composite particles, a composite material, in some embodiments, can have a black color. In one embodiment, a composite material comprising a plurality of sintered composite particles has a spectral reflectance of less than about 10 percent. In another embodiment, a sintered composite material has a spectral reflectance of less than about 5 percent or less than about 3 percent. A sintered composite material, in some embodiments, has a spectral reflectance of less than about 1 percent.

Additionally, in comprising a plurality of sintered composite particles of the present invention, a composite material, in some embodiments, is free or substantially free of fibrillated PTFE.

In some embodiments, a composite material comprising a plurality of sintered composite particles of the present invention is electrically insulating having an electrical resistance of greater than about $10^{18}$ ohm/m, greater than about $10^{17}$ ohm/m, or greater than about $10^{16}$ ohm/m. In other embodiments, a composite material comprising a plurality of sintered composite particles is electrostatically conductive having a resistance of less than about $10^{12}$ ohm/m, less than about $10^{8}$ ohm/m, less than about $10^{6}$ ohm/m, or less than about $10^{4}$ ohm/m. These differences in conductivity of the composite particles may be achieved by selecting the type of carbon and its wt % in the mixture with PTFE. Conductive carbon includes but is not limited to carbon black powders or graphite, such as ENSECO®, conductive carbon black and Super P® conductive carbon black from Timcal LTD from Switzerland.

A composite material comprising a plurality of sintered composite particles, the composite particles comprising a PTFE component and a carbonaceous component dispersed throughout the PTFE component, in some embodiments, is resistant to dissociation into the individual component parts when subjected to various stresses, including mechanical stresses. As a provided herein and illustrated in FIG. 2 as a composite particle, the carbonaceous component of a composite particle is fused into and dispersed throughout the PTFE component. Such a structural arrangement inhibits or precludes separation or dissociation of the carbonaceous component from the PTFE component. As a result, sintered composite materials of the present invention, in some embodiments, do not shed or leach the carbonaceous component.

Figure 3:
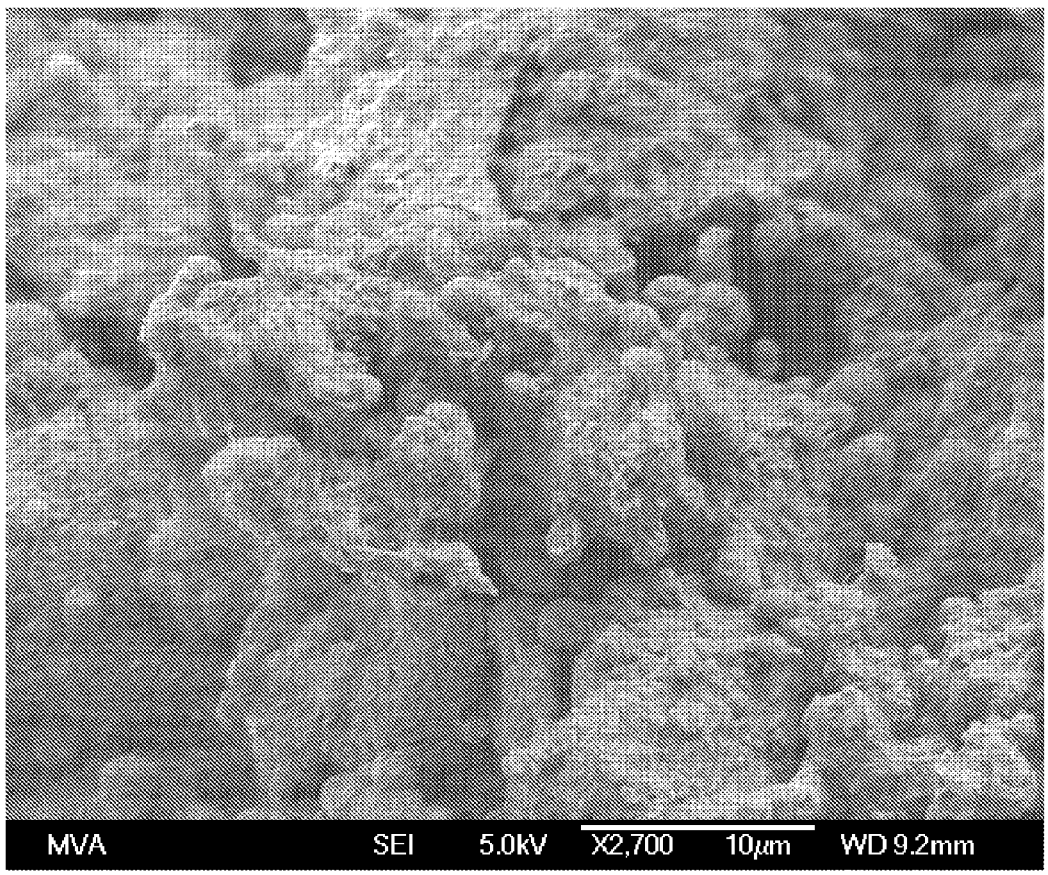
FIG. 3 illustrates an SEM image of a sintered composite material taken at a magnification of 2700× according to one embodiment of the present invention.
Figure 4:
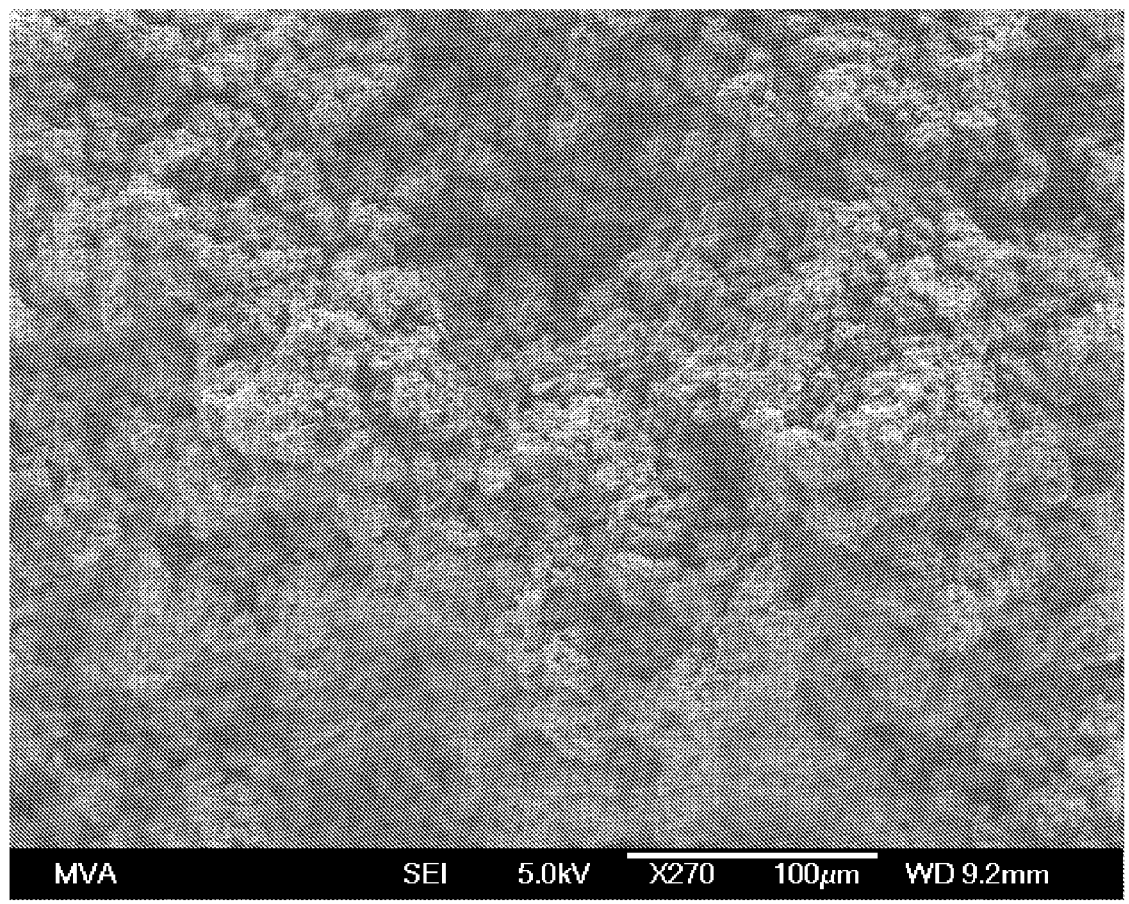
FIG. 4 illustrates a SEM image of a top view of a porous composite membrane comprised of composite particulate PTFE particles in which carbon is uniformly dispersed within the PTFE particles and is not visible. The pores are the void spaces between the composite particulate PTFE particles. Magnification of 270×.
Figure 5:
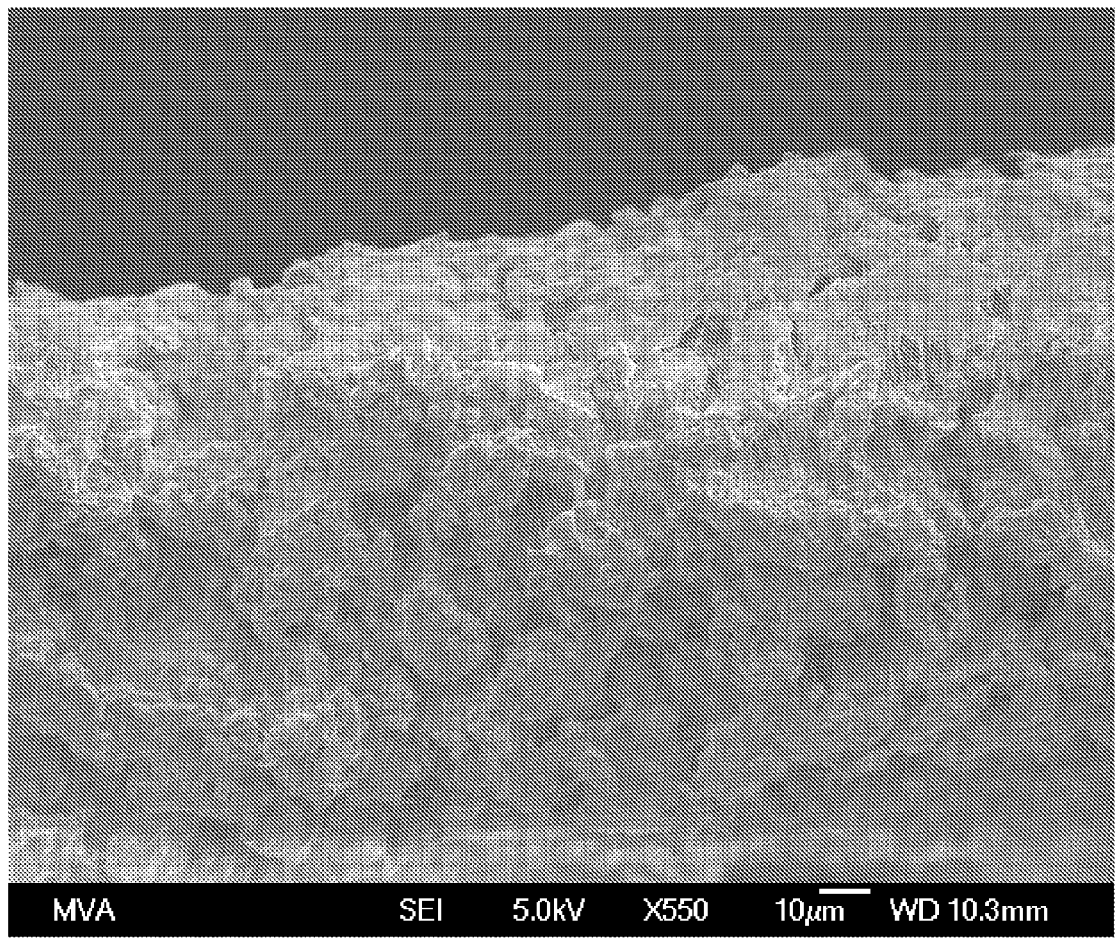
FIG. 5 illustrates an SEM image of a cross-section membrane of a porous composite membrane comprised of composite particulate PTFE particles in which carbon is uniformly dispersed within the PTFE particles and is not visible. The pores are the void spaces between the composite particulate PTFE particles. Magnification of 550×.

FIG. 3 is an SEM image of a sintered composite material taken at a magnification of 2700× according to one embodiment of the present invention. As illustrated in FIG. 3, the composite particles comprising a PTFE component and a carbonaceous component are sintered to form a porous composite material. Additionally, similar to the SEM image of FIG. 2, carbon black powder of the carbonaceous component is dispersed throughout the particles of the PTFE component and does not reside on surfaces of the PTFE particles in the sintered porous material.

Methods of Making Sintered Porous Composite Materials

In another aspect, the present invention provides methods of making porous composite materials comprising a plurality of sintered composite particles, the composite particles comprising a PTFE component and a carbonaceous component dispersed throughout the PTFE component. In one embodiment, a method of making a sintered porous material comprises providing a plurality of composite particles comprising a PTFE component and a carbonaceous component dispersed throughout the PTFE component, disposing the plurality of particles in a mold, applying a compressive force to the composite particles, relieving the compressive force on the composite particles, heating the composite particles to a temperature above the microcrystalline melting point of the PTFE component to form a porous composite material and cooling the porous composite material.

Composite particles comprising a PTFE component and a carbonaceous component for use in methods of the present invention are consistent with the same described herein. In some embodiments, composite particles of the present invention are provided according to the method described hereinabove. Moreover, in some embodiments, the composite particles are compressed with a compressive force up to about 900 kgm/cm². In one embodiment, composite particles are compressed with a compressive force ranging from about 40 kgm/cm² to about 900 kgm/cm² or from about 150 kgm/cm² to about 300 kgm/cm². In another embodiment, composite particles are compressed with a compressive force ranging from about 50 kgm/cm² to about 100 kgm/cm².

After relieving the compressive force on the composite particles, the composite particles are heated, in some embodiments, to a temperature of about 300° C., of about 320° C., of about 340° C., of about 360° C., or of about 380° C. The period of time over which the particles are heated is directly proportionate to the volume of particles present. Generally, according to some embodiments, the composite particles are heated for a time period ranging from about 30 minutes to about 15 hours. In some embodiments, the composite particles are heated for a time period ranging from about 1 hour to about 10 hours or from about 2 hours to about 5 hours. In a further embodiment, the composite particles are heated for a time period of less than about 30 minutes or greater than about 15 hours.

During the heating process, the composite particles are sintered and a large expansion of the material can occur in a direction opposite that of the compressive force. The resulting material comprising the sintered composite particles is subsequently cooled. Cooling, in some embodiments, is effectuated in a controlled manner either slowly or by quenching depending on the desired properties of the composite material. Quenching, in some embodiments, results in a composite material with higher porosity.

In some embodiments, composite materials comprising a plurality of sintered composite particles of the present invention are produced according to the methods described in U.S. Pat. Nos. 5,677,047 and 5,514,231.

Membranes Comprising Sintered Porous Composite Materials

In another aspect, the present invention provides a membrane comprising a porous composite material, the porous composite material comprising a plurality of sintered composite particles, the composite particles comprising a PTFE component and a carbonaceous component dispersed throughout the PTFE component. A membrane, according to some embodiments of the present invention, can demonstrate properties consistent with those provided for sintered composite materials described herein.

In some embodiments, a membrane has a thickness ranging from about 50 µm to about 5 mm. In some embodiments, a membrane has a thickness ranging from about 100 µm to about 5 mm. In other embodiments, a membrane has a thickness ranging from about 200 µm to about 3 µm, from about 500 µm to about 1 µm, or from about 300 µm to about 500 µm. In another embodiment, a membrane has a thickness less than about 100 µm or greater than about 5 mm. Moreover, in some embodiments, a membrane has a water intrusion pressure ranging from about 0.2 pounds per square inch (psi) to about 60 psi.

Additionally, a membrane comprising a porous composite material of the present invention can be produced by methods described herein for making sintered composite materials. In one embodiment, a membrane can be formed in a mold to any desired thickness. In another embodiment, a membrane can be skived to any desired thickness from a sintered composite material of the present invention.

Membranes of the present invention, in some embodiments, are used in fluid filtration applications. In other embodiments, membranes of the present invention are used in porous barrier applications, including protective covers for electronic equipment such as speakers, microphones, and other electronic devices. In some embodiments wherein membranes of the present invention are used as protective covers for audio equipment, the membranes can display an acoustic transmission loss of less than about 3 decibel (db) at frequencies ranging from about 300 to 3000 Hertz (Hz). In other embodiments, membranes of the present invention can display an acoustic transmission loss of less than about 2 db or less than about 1 db at frequencies ranging from about 300 to 3000 Hz. In some embodiments, membranes of the present invention are used as vents and/or packaging for electronic devices, including microelectronic devices. In a further embodiment, membranes of the present invention are used as electromagnetic shields. In other embodiments, membranes of the present invention are used in applications for absorbing visible light and ultraviolet radiation.

Membranes Comprising First and Second Surfaces

In another aspect, the present invention provides a membrane comprising a first surface and a second surface, wherein the first surface has a lighter color than the second surface. In some embodiments, for example, the first surface has a spectral reflectance of greater than about 80 percent, greater than about 90 percent or greater than about 95 percent while the second surface has a spectral reflectance of less than about 30 percent, less than about 20 percent, less than about 10 percent or less than 5 percent. In some embodiments, the first and a second surfaces are in facing opposition to one another on opposing sides of the membrane. In other embodiments, the first and second surfaces are adjacent to one another on the same side of the membrane.

In some embodiments, the first surface of the membrane comprises a porous polymeric material comprising a plurality of sintered polymeric particles. In one embodiment, the polymeric particles comprise PTFE. In other embodiments, the polymeric particles comprise polyolefins, polyamides, polyesters, rigid polyurethanes, polyacrylonitriles, polycarbonates, polyvinylchloride, polymethylmethacrylate, polyvinylidene fluoride, polyethersulfones, polystyrenes, polyether imides, polyetheretherketones, polysulfones, and combinations and copolymers thereof. In some embodiments, a polyolefin comprises polyethylene, polypropylene, and/or copolymers thereof. Polyethylene, in one embodiment, comprises high density polyethylene (HDPE). High density polyethylene, as used herein, refers to polyethylene having a density ranging from about 0.92 g/cm$^3$ to about 0.97 g/cm$^3$. In some embodiments, high density polyethylene has a degree of crystallinity ranging from about 50 to about 90. In another embodiment, polyethylene comprises ultrahigh molecular weight polyethylene (UHMWPE). Ultrahigh molecular weight polyethylene, as used herein, refers to polyethylene having a molecular weight greater than 1,000,000.

Moreover, in some embodiments, the second surface of the membrane comprises a porous polymeric material comprising a plurality of sintered composite polymeric particles, the composite polymeric particles comprising a PTFE component and a carbonaceous component dispersed throughout the PTFE component as described herein. In other embodiments, the second surface comprises black polymeric materials, black inks, black coatings, or particulate carbonaceous materials including carbon black, graphite, amorphous carbon, carbon fiber, active carbon, carbon nanotubes, or mixtures thereof.

The first and second surfaces, according to some embodiments of the present invention, can have properties consistent with any of those provided for sintered composite materials described herein. In some embodiments, for example, the first and second porous surfaces can demonstrate average pores sizes and porosities consistent with sintered porous composite materials of the present invention.

The first and second surfaces of a membrane, in some embodiments, have the same or substantially the same structure, including average pore size and porosity. In other embodiments, the first and second surfaces have divergent structures. In such embodiments, porosity and/or pore size gradients can be established between the first and second surfaces. In one embodiment, for example, the first surface can have an average pore size and/or porosity greater than the second surface. In another embodiment, the second surface can have an average pore size and/or porosity greater than the first surface.

In a further embodiment, the present invention provides methods of making a membrane comprising a first surface and a second surface wherein the first surface has a lighter color than the second surface. In one embodiment, a method of making such a membrane comprises providing a first membrane comprising a first surface, providing a second membrane comprising a second surface, and coupling the first membrane to the second membrane, wherein the first surface has a lighter color than the second surface. In some embodiments, the first membrane is a white membrane and the second membrane is a black membrane. In some embodiments, the first surface comprises a porous polymeric material comprising a plurality of sintered polymeric particles. Polymeric particles suitable for sintering to produce the first surface, in some embodiments, are consistent with those described hereinabove for membranes comprising first and second surfaces.

In some embodiments, the second surface comprises a porous polymeric material comprising a plurality of sintered composite polymeric particles, the composite polymeric particles comprising a PTFE component and a carbonaceous component dispersed throughout the PTFE component as described herein. Moreover, in some embodiments, coupling the first membrane to the second membrane comprises providing an adhesive and disposing the adhesive between the first membrane and the second membrane. Adhesives, in some embodiments, comprise hot melt adhesives. In some embodiments, hot melt adhesives are available in a variety of chemistries over a range of melting points. Hot melt adhesives, in some embodiments, are in the form of a web, non-woven material, woven material, powder, solution, or any other suitable form. In one embodiment, the adhesive is hot melt adhesive which is a thin sheet of nonwoven material that is placed between the first membrane to the second membrane. Useful adhesives include but are not limited to Spunfab PA series products (Cuyahoga Falls, Ohio) and engineered nonwoven binding webs from Midwest Filtration (Cincinnati, Ohio).

Once the adhesive is disposed between the first and second membranes, the resulting construction, in some embodiments, is heated and compressed to couple the first and second membranes. Heating can occur at temperatures of from about 80° C. to about 200° C. at pressures of about 0 psi to about 80 psi.

The following examples will serve to further illustrate the present invention without, at the same time, however, constituting any limitation thereof. On the contrary, it is to be clearly understood that resort may be had to various embodiments, modifications and equivalents thereof which, after reading the description herein, may suggest themselves to those skilled in the art without departing from the spirit of the invention.

Example 1

Composite Particles Comprising a PTFE Component and a Carbonaceous Component

A mixture of PTFE particles (PTFE component) and carbon black (carbonaceous component) was obtained from 3M (St. Paul, Minn.) under the trade designation Dyneon. The PTFE-carbon black mixture comprised 1.2 weight percent carbon black particles. Consistent with FIG. 1, the carbon black resided on the exterior surfaces of the PTFE particles. The PTFE-carbon black mixture was placed into a flat mold having an area of 600 mm×700 mm and heated to a temperature of 340° C. for about two hours under ambient pressure. The mold was subsequently cooled to room temperature and the black PTFE slab was removed from the mold. The black PTFE slab was ground to form composite particles having an average size of about 60 μm. Consistent with the composite particles shown in FIG. 2, the carbon black was fused into and dispersed throughout the PTFE particles as described herein.

Example 2

Membrane Comprising a Plurality of Sintered Composite Particles

The composite particles of Example 1 were placed into a pressure mold as described in U.S. Pat. No. 5,514,231 at a pressure of about 60 bar. The mold was heated to 360° C. for about 8 hours. The mold was subsequently cooled to room temperature and a sintered porous composite black PTFE cylinder was removed from the mold. A composite membrane was prepared by skiving the cylinder. The sintered composite black PTFE membrane had an average pore size of 5 µm. The average pore volume of the membrane was about 40%. The membrane had a spectral reflectance of less than 20%.

Example 3

Membrane Comprising a First Surface and a Second Surface

A PTFE membrane comprising a white surface and a black surface was constructed according to the following procedure. A white PTFE membrane was made in a similar manner to the black PTFE membrane by using the pure PTFE particles. The white PTFE membrane was laminated to the sintered black composite PTFE membrane of Example 2 by providing a polyamide based adhesive fabric between the white and black PTFE membranes. The resulting structure was subsequently heated to a temperature of 130° C. under pressure to produce a unitary membrane comprising a white side having a spectral reflectance greater than 90% and a black side having a spectral reflectance of less than 20%. The membrane had an average pore size of 5 µm. The average pore volume of the membrane was about 40%.

All patents, publications and abstracts cited above are incorporated herein by reference in their entirety. It should be understood that the foregoing relates only to preferred embodiments of the present invention and that numerous modifications or alterations may be made therein without departing from the spirit and the scope of the present invention as defined in the following claims.

The invention claimed is:

1. A method of making a sintered porous membrane comprising a two-step method comprising:
a first step comprising providing a PTFE component comprising a plurality of PTFE particles;
providing a carbonaceous component;
mixing the PTFE component and the carbonaceous component to form a mixture;
heating the mixture to a temperature of about the microcrystalline melting point of the PTFE component to form a thermally treated material wherein the individual PTFE particles of the PTFE component are softened and are not completely fused together and wherein the carbonaceous component is dispersed throughout the PTFE component; and
a second step comprising breaking the thermally treated material into composite particles comprising a PTFE component and a carbonaceous component dispersed throughout the PTFE component;
providing a plurality of the composite particles;
disposing the plurality of the composite particles in a mold;
applying a compressive force to the composite particles;
relieving the compressive force on the composite particles;
heating the composite particles to a temperature above the microcrystalline melting point of the PTFE component to form a porous composite material;
cooling the porous composite material;
removing the porous composite material from the mold, and
skiving the porous composite material to make a membrane.

2. The method of claim 1, wherein the temperature is from about 320° C. to about 380° C.

3. The method of claim 1, wherein the compressive force is from about 40 kgm/cm$^2$ to about 900 kgm/cm$^2$.

4. The method of claim 1, wherein the carbonaceous component comprises black polymeric materials, black inks, black coatings, or particulate carbonaceous materials selected from the group consisting of carbon black, graphite, amorphous carbon, carbon fiber, active carbon, and carbon nanotubes, or mixtures thereof.

5. The method of claim 4, wherein the particulate carbonaceous material is carbon black.

6. A sintered porous membrane made by the method of claim 1.

7. The membrane of claim 6, comprising a porosity ranging from about 10 percent to about 90 percent.

8. The membrane of claim 6, comprising a first surface and a second surface, wherein the first surface has a lighter color than the second surface.

9. The membrane of claim 8, wherein the first surface has a spectral reflectance of greater than about 90 percent and the second surface has a spectral reflectance of less than about 20 percent.

10. The membrane of claim 6, comprising an average pore size ranging from about 0.1 µm to about 500 µm, and a porosity ranging from about 10 percent to about 90 percent.

11. The membrane of claim 10, comprising an electrical resistance of greater than about $10^{16}$ ohm/m.

12. The membrane of claim 10, comprising an electrical resistance of less than about $10^{12}$ ohm/m.

13. The membrane of claim 10, wherein the membrane comprises an average pore size from about 0.1 µm to about 100 µm.

14. The membrane of claim 6, wherein the membrane is a black colored membrane.

15. The membrane of claim 6, wherein the membrane is an electrostatic conductive membrane.

16. The membrane of claim 6, wherein the membrane comprises a thickness of about 50 µm to about 5 mm.

17. The membrane of claim 6, wherein the membrane comprises a pore size from about 0.5 µm to about 50 µm.

18. The membrane of claim 6, wherein the membrane comprises a porosity from about 20% to about 60%.

19. The method of claim 1, wherein the mixture of the PTFE component and the carbonaceous component comprises from about 1 weight percent to about 30 weight percent carbonaceous component.

* * * * *